(12) United States Patent
Raju

(10) Patent No.: US 11,283,363 B2
(45) Date of Patent: Mar. 22, 2022

(54) MODULAR POWER CONVERSION SYSTEM WITH GALVANIC INSULATION

(71) Applicant: Ravisekhar Nadimpalli Raju, Clifton Park, NY (US)

(72) Inventor: Ravisekhar Nadimpalli Raju, Clifton Park, NY (US)

( * ) Notice: Subject to any disclaimer, the term of this patent is extended or adjusted under 35 U.S.C. 154(b) by 0 days.

(21) Appl. No.: 16/997,573

(22) Filed: Aug. 19, 2020

(65) Prior Publication Data

US 2021/0067050 A1    Mar. 4, 2021

Related U.S. Application Data

(60) Provisional application No. 62/891,946, filed on Aug. 26, 2019.

(51) Int. Cl.
| | |
|---|---|
| H02M 5/10 | (2006.01) |
| H02M 5/293 | (2006.01) |
| H02M 7/217 | (2006.01) |
| H02M 1/00 | (2006.01) |

(52) U.S. Cl.
CPC ......... H02M 5/293 (2013.01); H02M 1/0077 (2021.05); H02M 5/10 (2013.01); H02M 7/2173 (2013.01); *H02M 1/0067* (2021.05); *H02M 1/0074* (2021.05)

(58) Field of Classification Search
CPC ...... H02M 5/10; H02M 5/293; H02M 7/2173; H02M 1/0067; H02M 1/0074; H02M 1/0077; H02M 1/0083
See application file for complete search history.

(56) References Cited

U.S. PATENT DOCUMENTS

| | | | | |
|---|---|---|---|---|
| 6,100,663 | A | * | 8/2000 | Boys ...................... H02J 50/10 320/108 |
| 10,205,379 | B2 | * | 2/2019 | Caiafa ................... H02M 3/285 |

* cited by examiner

*Primary Examiner* — Gary L Laxton

(57) ABSTRACT

A modular power conversion system is provided which includes a plurality of building blocks comprised of transformers and power conversion bridges, and a high frequency AC link that transfers power and provides galvanic isolation between the building blocks. The high frequency link includes an insulating tube separating an AC link conductor and the building blocks. The insulating tube is further provided with conductive or semiconductive layers on its inner and outer surfaces for referencing them to the electric potentials of the adjacent conductors and windings, thereby placing the high electric fields substantially directly across the tube and reducing electric fields and partial discharge or corona in the adjoining space or media. The building blocks may be arranged in multiple stacks for DC or AC interface, preferably with neutral or lower voltage connections at the outer edges of the stacks and higher voltage terminals at the centers of the stack.

20 Claims, 9 Drawing Sheets

MODULAR POWER CONVERSION SYSTEM WITH GALVANIC INSULATION

CROSS-REFERENCE TO RELATED APPLICATION

This application claims the benefit of U.S. Provisional Patent Application No. 62/891,946, filed 26 Aug. 2019, which is incorporated by reference herein in its entirety.

STATEMENT OF GOVERNMENT INTEREST

Portions of this invention were made with government support under DE-SC0020859 awarded by Office of Science, U.S. Department of Energy. The government has certain rights in the invention.

BACKGROUND

The present disclosure relates to a modular power conversion system with galvanic insulation. Specifically, the present invention relates to a modular power conversion system with building blocks comprising transformers and power converter bridges wherein the building blocks are coupled through a high frequency AC link.

Transformers are widely used in electric power systems for functions such as step-up or step-down of voltages. They are often used in concert with switching power devices such as power semiconductors to provide power conversion with galvanic isolation. In switch-mode power supplies, such as those used in laptop computer adapters, incoming line frequency AC which is typically 50 or 60 Hz is converted to high frequency through fast-switching transistors and fed to transformers for step-down followed by rectification to DC. Here high frequency refers to a frequency greater than the line frequency, e.g., 400 Hz, tens of kHz, a few MHz, etc. Generally, high frequency operation instead of line frequency operation can reduce the size and weight of the transformer since a smaller magnetic core can be used. Power conversion using high frequency transformers instead of line frequency transformers can also be extended to higher voltage and power applications such as electric locomotives, wind turbines or industrial motor drives and bring benefits of reduced size and weight of transformer core and winding at higher operating frequency. However, for higher voltage applications, even though the transformer core and windings can be reduced through the use of higher frequency, the insulation used between transformer components such as primary and secondary windings and core often remains sizeable and complex to satisfy adequate functional and safety isolation requirements. Oil is often used as an insulating medium due to good dielectric properties. In dry-type transformers, materials such as paper, epoxy, fiberglass, Nomex® and Kapton® are used as insulating media instead of oil. In many applications, oil-filled transformers are not preferred due to issues such as flammability or possibility of leaks. Dry-type transformers using insulating materials such as epoxy are susceptible to partial discharge breakdown particularly if there are voids or pockets of air in the dielectric space. They are also generally more difficult to manufacture and costlier than oil-filled transformers for high power applications. Therefore, what is needed are techniques that overcome the above mentioned disadvantages.

BRIEF SUMMARY OF THE INVENTION

Embodiments of the invention provide a power conversion system with modular building blocks comprising arrangement of transformers and power converter bridges, wherein the modular building blocks are coupled with a high frequency AC link with galvanic insulation.

In accordance with one aspect of the invention, a plurality of modular building blocks that include transformers and power converter bridges are coupled through a galvanically isolated high frequency current link. The high frequency link is magnetically coupled through the transformers in the building blocks but electrically insulated from the building blocks with a tube of high dielectric strength. The insulating tube can span over multiple building blocks to enhance structural and dielectric integrity. According to another aspect of the invention, sections of the insulating tube are coated with conductive or semiconductive layer on the inner and outer surfaces and each layer is electrically referenced to a respective adjacent winding or high frequency link. This ensures that potential gradient between the windings/core and the high frequency link is impressed substantially across the dielectric tube and any potential gradients across air gaps in the transformers are minimized thus reducing partial discharge or corona effects.

According to yet another aspect of the invention, multiple building blocks of a modular transformer and power converter arrangement are combined in a stack with a parallel connection of two sets of building blocks, and a series connection of the building blocks within each of the two sets. The stacks are arranged and controlled such that the neutral potential of the resulting total AC or DC port is placed at the two outside edges of the stack and the high voltage potential of the AC or DC port is placed at the center of the stack.

According to yet another aspect of the invention the modular building blocks contain multiple transformers or transformer sections such that the high frequency galvanically isolated link can be routed through the building blocks in a manner that reduces electromagnetic interference by reducing the loop area enclosed by the high frequency link.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
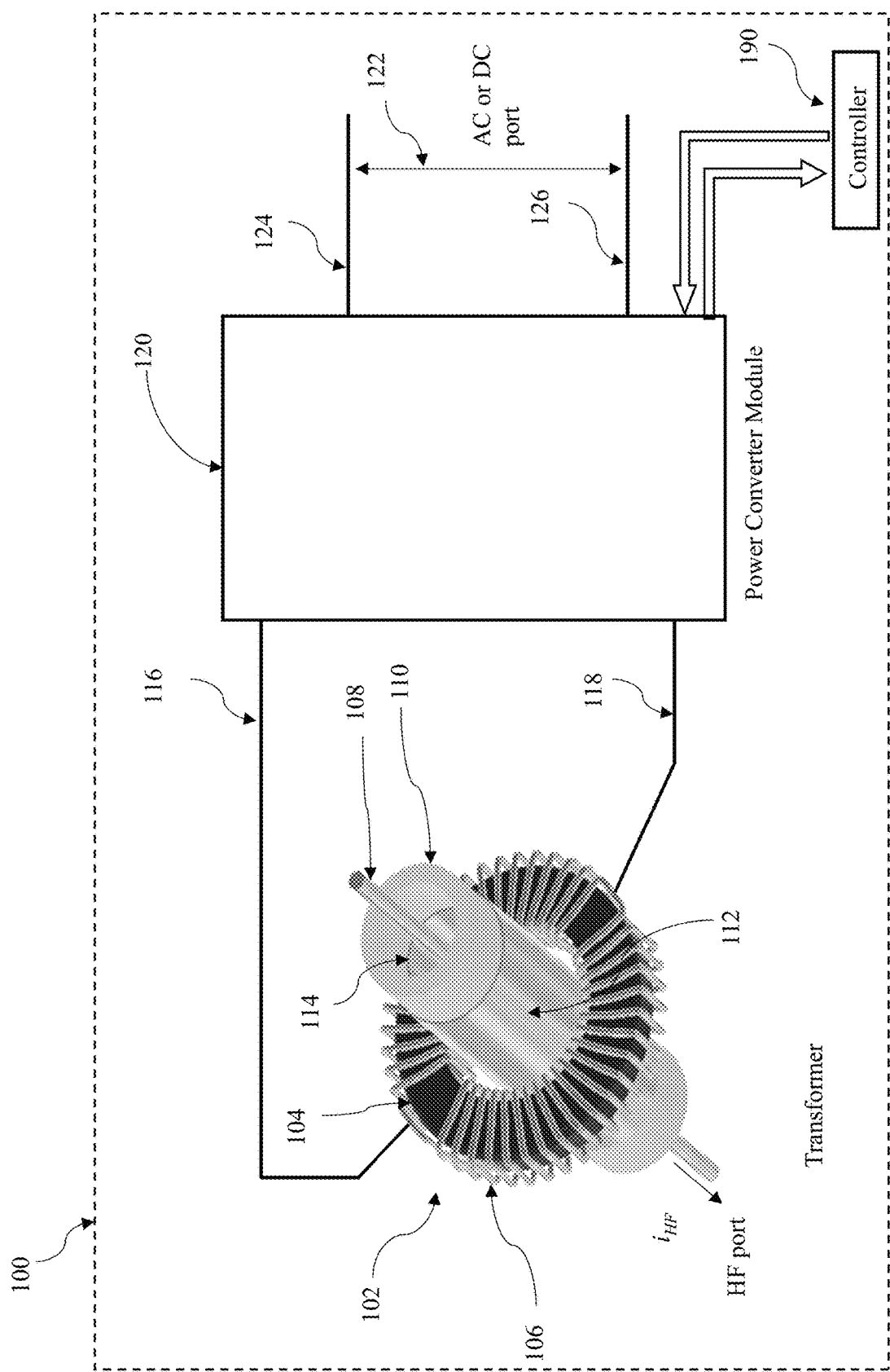
FIG. 1 illustrates a building block for the power conversion system with modular transformer and power converter arrangement and with galvanic isolation, according to one embodiment of the present invention.

FIG. 1 illustrates a building block, 100, for a power conversion system with modular transformer and power converter arrangement and with galvanic isolation according to an embodiment of the present invention. The building block contains power conversion module, 120, coupled to transformer, 102. The power conversion module has an AC or DC port, 122, with terminals 124 and 126, and high frequency terminals 116 and 118. The power conversion module processes and transfers power between the AC or DC port and the high frequency terminals through, for example, switching action of transistors. Transformer winding 106 is dispositioned around transformer core 104 and connected to the high frequency terminals 116 and 118 of the power converter module. A toroidal core 104 is shown in the figure, but other core shapes such as C cores can be used. A second transformer winding 108 is also positioned through the window of the core. A solid conductor is shown for the purpose of simplifying the illustration, however other conductors such as litz wire and hollow conductors can be used for the winding 108. Winding 108 is coupled with winding 106 through transformer action and provides a galvanically isolated high frequency port to transfer power between modular building block, 100, and other modular building blocks. Winding 108 is surrounded by an insulating tube, 110, that galvanically isolates it from winding 106 and core 104. In a preferred embodiment, the tube is built with inorganic material such as mica or ceramic to provide high dielectric strength. In a further preferred embodiment, a portion of the outer surface of the tube is coated with a conductive or semiconductive layer 112 and a portion of the inner surface of the tube is coated with a conductive or semiconductive layer 114. Layer 112 is electrically referenced to winding 106, through for example, a wired connection to the center point of winding 106. Layer 114 is electrically referenced to winding 108, through for example, a wired connection to the center point of conductor of winding 108. This arrangement places the voltage potential difference between windings 106 and 108 substantially between layers 112 and 114, i.e., across the insulating tube 110, thus avoiding any substantial voltage gradients across the air in the space between windings 106 and 108. This reduces the occurrence of partial discharge and corona which is generally caused by the presence of high voltage gradients across air gaps or voids. A single transformer 102 with a single core 104 is shown coupled to a single power conversion module 120 in the modular building block 100. However, any combination of a single or multiple transformers can be coupled to a single or multiple power conversion modules through series or parallel connections in the modular building block 100. A controller 190 may be used for communications, sensing quantities such as voltage or current, and to control the switching devices in the power converter module.

Figure 2:
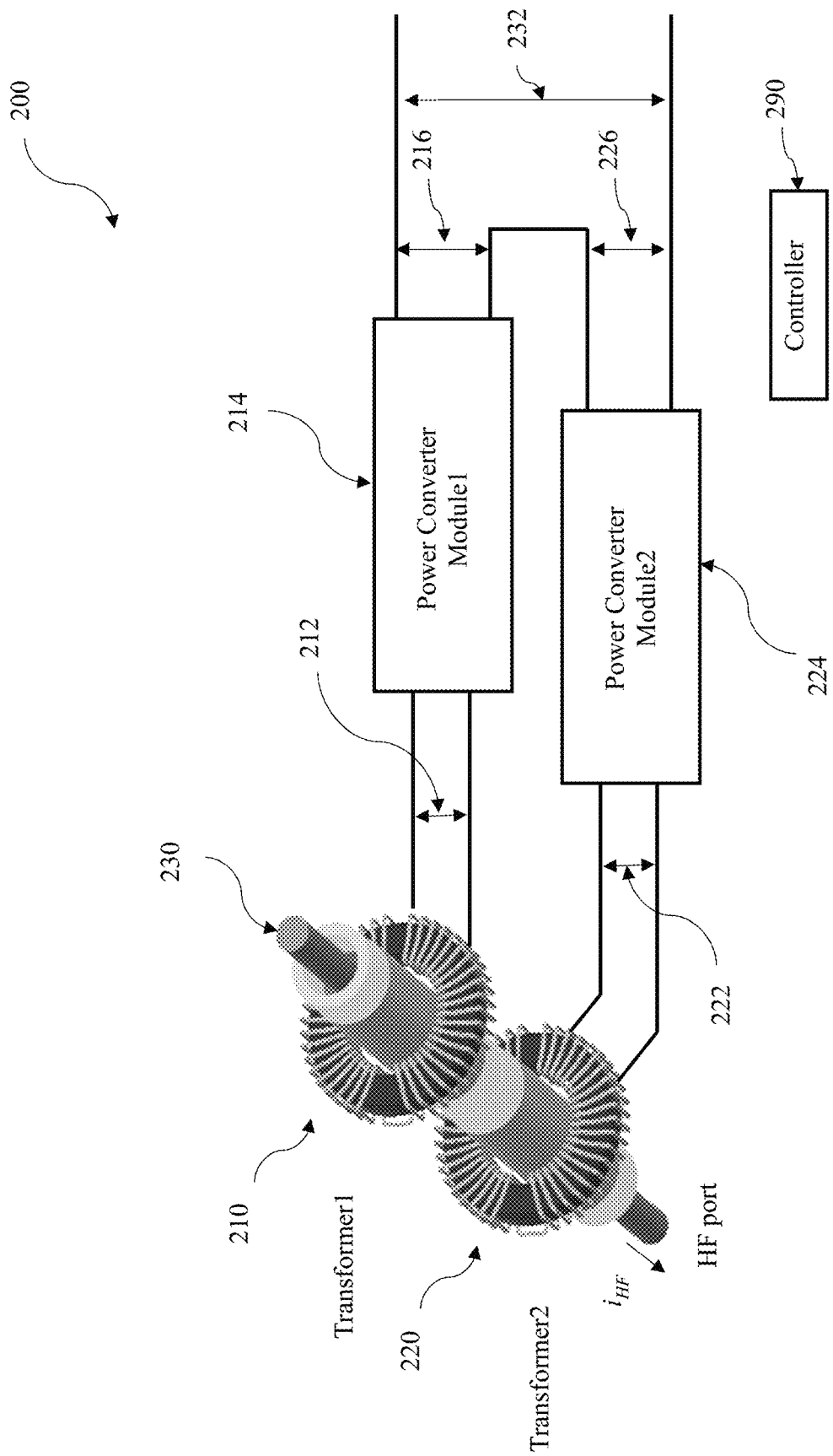
FIG. 2 illustrates a combination of two building blocks of the power conversion system with modular transformer and power converter arrangement and with galvanic isolation, according to one embodiment of the present invention.

FIG. 2 illustrates a combination 200 of two building blocks for the modular transformer and power converter arrangement with galvanic insulation according to an embodiment of the present invention. Transformer 210 and power converter module 214 are part of one building block, while transformer 220 and power converter module 224 are part of the second building block. Power converter module 214 transfers power between its AC or DC terminals 216 and transformer 210 through high frequency connection 212. Power converter module 224 transfers power between its AC or DC terminals 226 and transformer 220 through high frequency connection 222. Conductor 230 is shared as a common winding that passes through both transformers 210 and 220 and has high insulation to the other parts of transformers 210 and 220 according to the description for FIG. 1. Conductor 230 when put in a closed circuit serves as a high frequency link for transferring power between two or more modular building blocks in a galvanically isolated manner. A controller 290 that may be centrally-located or distributed within the building blocks may be used for communications, sensing quantities such as voltage or current, and to control the switching devices in the power converter modules. The terminals 216 and 226 of power converter modules 214 and 224 respectively are added in series to obtain a common AC or DC port 232. In this case, a higher voltage can be obtained at 232 compared to the individual building blocks. In another embodiment, the terminals 216 and 226 could be combined in parallel to achieve an increased current handling capability from the resulting system.

Figure 3:
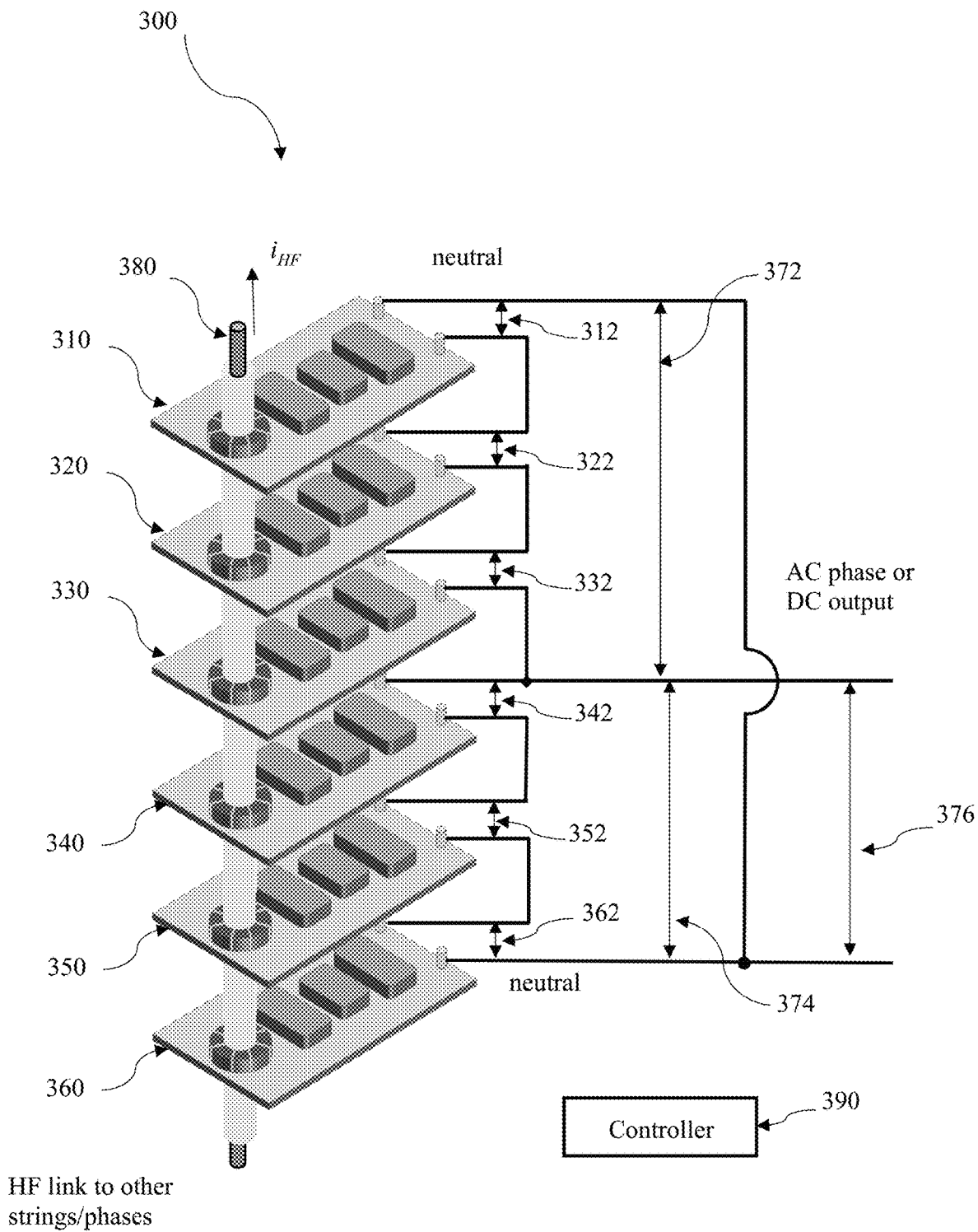
FIG. 3 illustrates a phase leg consisting of a combination of multiple building blocks of the modular transformer and power converter arrangement with galvanic isolation, and with one combined AC or DC port and one combined high frequency port, according to one embodiment of the present invention.

FIG. 3 illustrates a phase leg 300 comprising multiple building blocks for the modular transformer and power converter arrangement with galvanic isolation according to an embodiment of the present invention. Building blocks 310, 320, and 330 have AC or DC ports 312, 322, and 332 respectively which are combined in series to form AC or DC port 372; while blocks 340, 350, and 360 have AC or DC ports 342, 352, and 362 respectively which are combined in series to form AC or DC port 374. Ports 372 and 374 are further placed in parallel to form AC or DC port 376. The building blocks 310, 320, 330, 340, 350, and 360 share a common high frequency link 380 that is coupled to the transformers in the building blocks. The link 380 transfers power between the building blocks in the phase leg 300 or between phase leg 300 and other phase legs. The link 380 is designed with high galvanic isolation to other parts and other terminals of the building blocks 310, 320, 330, 340, 350 and 360 in the manner described for the insulation in FIG. 1. As shown in FIG. 3, the building blocks in phase leg 300 are arranged to locate the neutral connection or low voltage node at the two edges of the phase leg stack, while the phase output or high voltage node is located at the center of the stack. This ensures low voltage stresses at the two ends of the phase leg stack which is beneficial, e.g. for mounting the phase leg stack at its ends to a frame near or at ground potential. A controller 390 that may be centrally-located or distributed within the building blocks may be used for communications, sensing quantities such as voltage or current, and to control the switching devices in the power converter modules.

Figure 4:
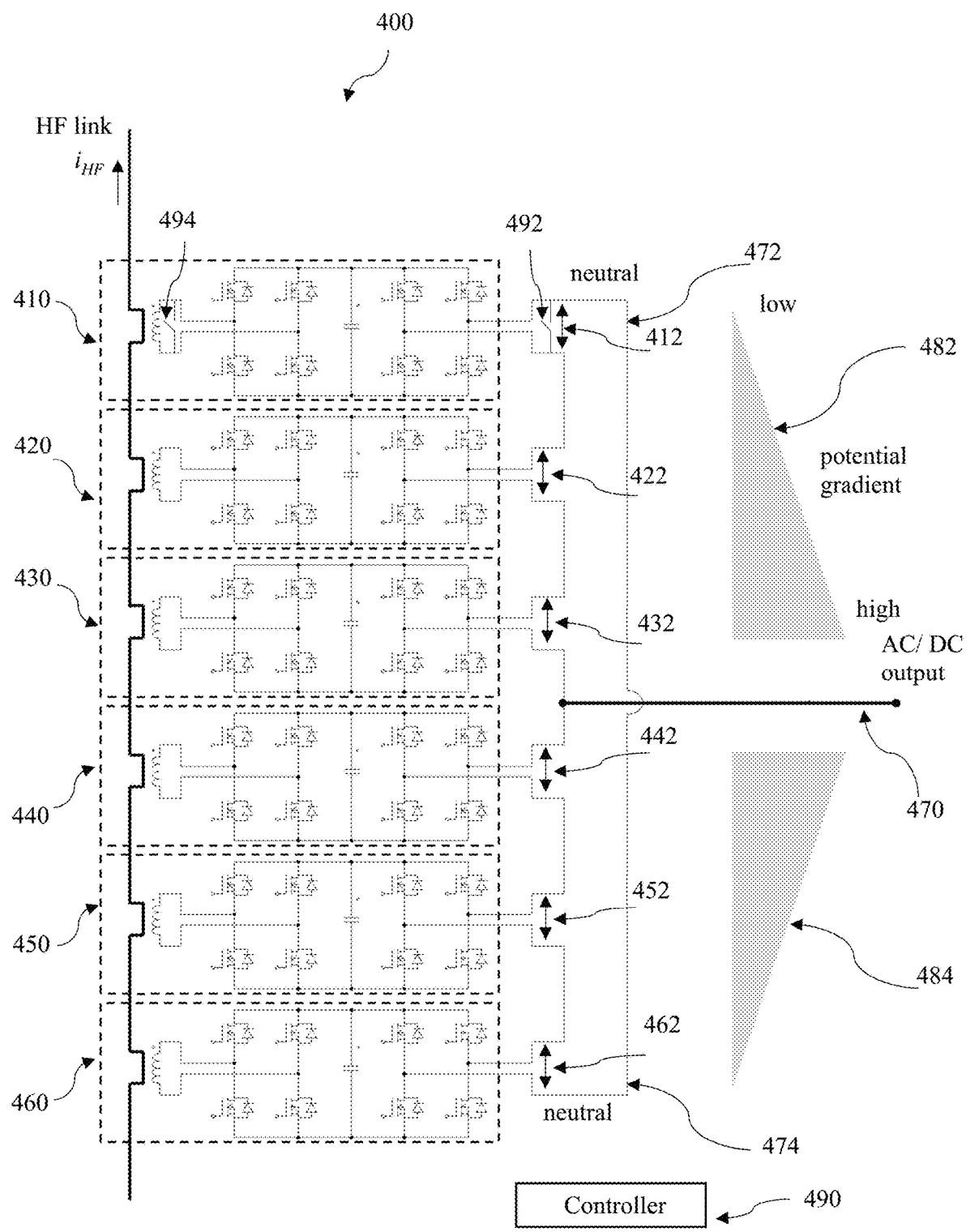
FIG. 4 shows an electrical schematic of the phase leg illustrated in FIG. 3, according to one embodiment of the present invention.

FIG. 4 shows an electrical schematic of the phase leg illustrated in FIG. 3 according to an embodiment of the present invention. The phase leg 400 consists of several modules, 410, 420, 430, 440, 450, and 460. Each of the modules has power switching bridges consisting of devices such as transistors for conversion between low frequency AC or DC and high frequency AC coupled to transformers, and can include components such as snubbers or resonant components to reduce switching losses in the bridges. The line frequency AC or DC ports, 412, 422, 432, 442, 452, and 462 are connected such that the outer terminals 472 and 474 of the phase leg stack form a common neutral and a center terminal 470 provides a high voltage AC or DC output. This ensures that the potential gradient 482 is such that the outer terminals 472 and 474 have low voltage stress with respect to ground, and the potential gradually builds up to the center terminal 470. In the embodiment shown in FIG. 4, the two sets of ports {412,422,432} and {442,452,462} are connected in series within the sets and the two sets are connected in parallel to provide a neutral and the AC or DC output 470. The building block modules are optionally provided with bypass switches to improve system reliability or availability. Bypass switches 492 and 494 shown as an example for module 410, are normally off, but can be closed to bypass module 410 in case it is damaged or non-functional, allowing the remaining modules to continue operation. A controller 490 that may be centrally-located or distributed within the building blocks may be used for communications, sensing quantities such as voltage or current, controlling the switching devices in the power converter modules, and activating appropriate bypass switches in case one or more building blocks need to be functionally isolated from the rest of the system.

Figure 5:
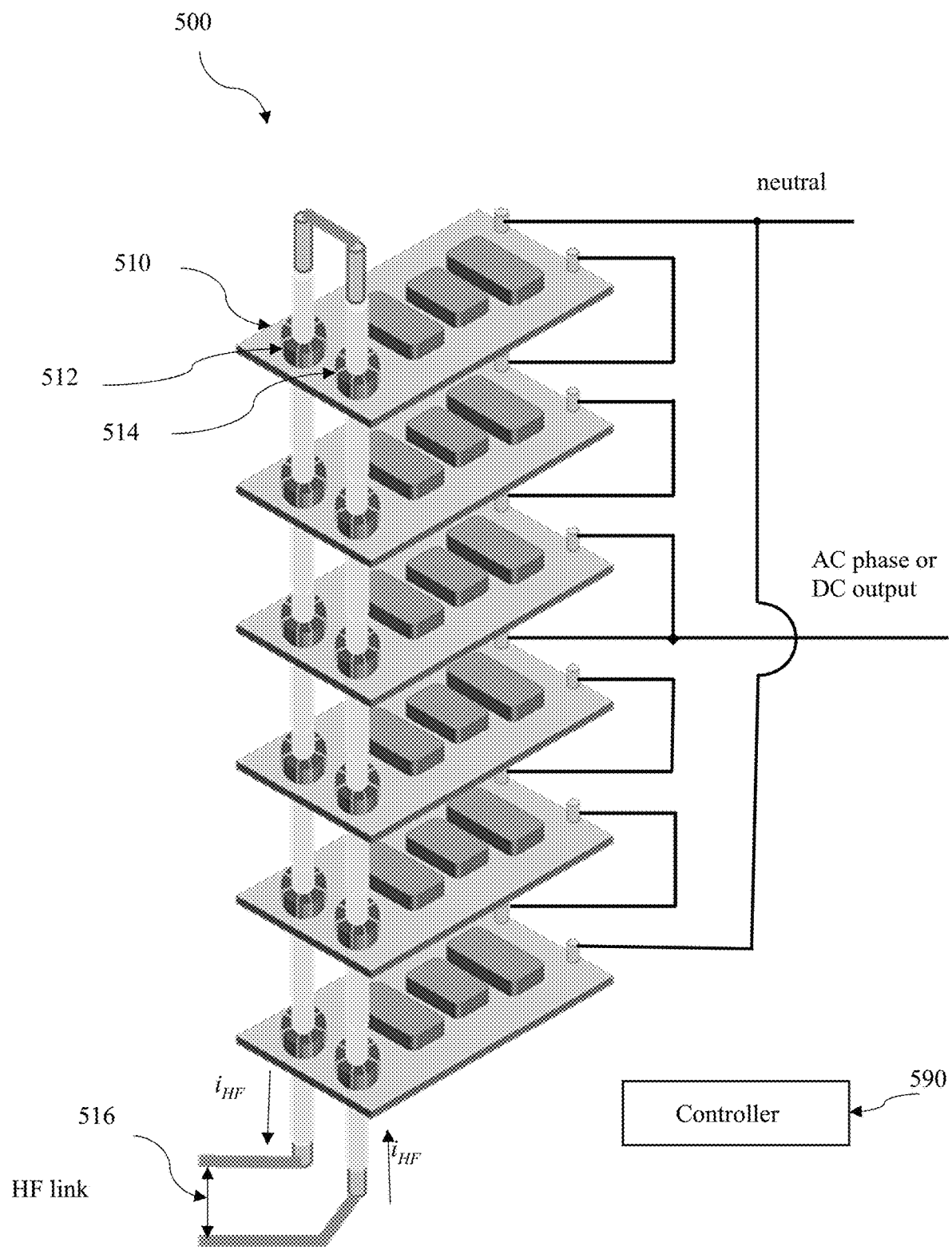
FIG. 5 illustrates a phase leg consisting of a combination of multiple building blocks of the modular transformer and power converter arrangement with galvanic isolation, according to one embodiment of the present invention, wherein each of the building blocks has a power conversion module coupled to multiple transformers or transformer sections whose primary or secondary windings are combined in series or parallel.

FIG. 5 illustrates a phase leg 500 comprising multiple building blocks for the modular transformer and power converter arrangement with improved insulation according to an embodiment of the present invention. Whereas in FIG. 3, the building blocks 310, 320, 330, 340, 350, 360 are illustrated with a single transformer each, FIG. 5 illustrates each building block to have multiple transformers. As an example, building block 510 consists of two transformers or transformer sections, 512 and 514, both of which are coupled to high frequency link 516. Employing multiple transformers enables use of multiple smaller cores with easier packaging or the possibility of reducing electromagnetic noise by laying out current paths for the high frequency link to substantially cancel their electromagnetic interference effects. A controller 590 that may be centrally-located or distributed within the building blocks may be used for communications, sensing quantities such as voltage or current, controlling the switching devices in the power converter modules, and activating appropriate bypass switches in case one or more building blocks need to be functionally isolated from the rest of the system.

Figure 6:
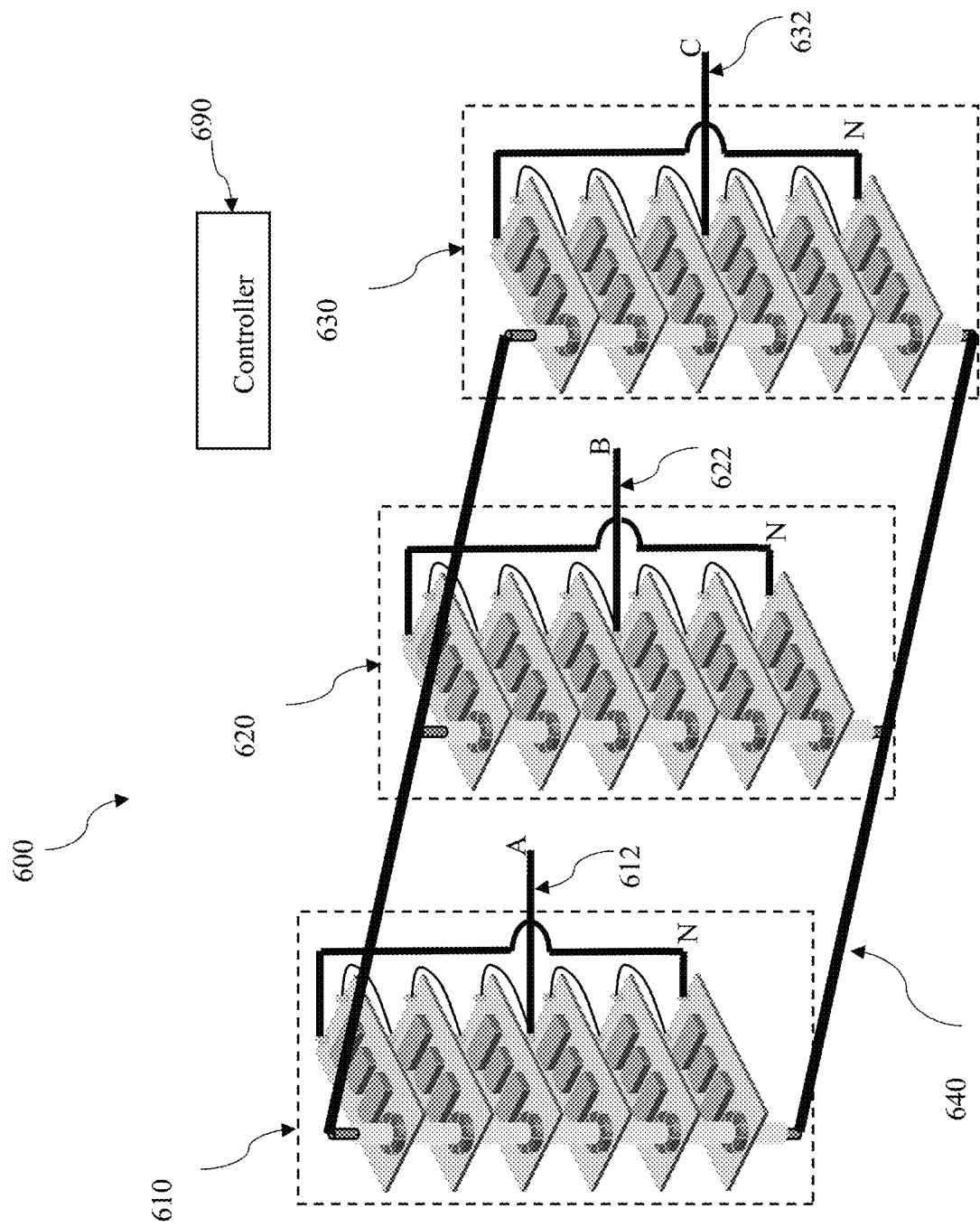
FIG. 6 illustrates a modular three-phase bridge with three-phase AC terminals and a high frequency link that is coupled to the three-phase bridge and is galvanically isolated from the three-phase AC terminals, according to one embodiment of the present invention.

FIG. 6 illustrates a three-phase bridge 600 comprising multiple phase legs 610, 620 and 630; wherein each of the phase legs is formed with building blocks using the modular transformer and power converter arrangement with improved insulation according to an embodiment of the present invention. The three-phase bridge has a high frequency link 640 which couples the three phases and output AC terminals 612, 622, 632. The high frequency link 640 is shown as a parallel coupling of the phase legs in this illustration, however series or a combination of series and parallel couplings is also feasible. In addition to or as an alternative to the three-phase configuration, other configurations such as DC and/or single-phase or poly-phase outputs can be constructed by using a suitable number of phase legs, instead of the three phase legs shown in FIG. 6. A controller 690 that may be centrally-located or distributed within the building blocks or phase legs may be used for communications, sensing quantities such as voltage or current, controlling the switching devices in the power converter modules, and activating appropriate bypass switches in case one or more building blocks need to be functionally isolated from the rest of the system.

Figure 7:
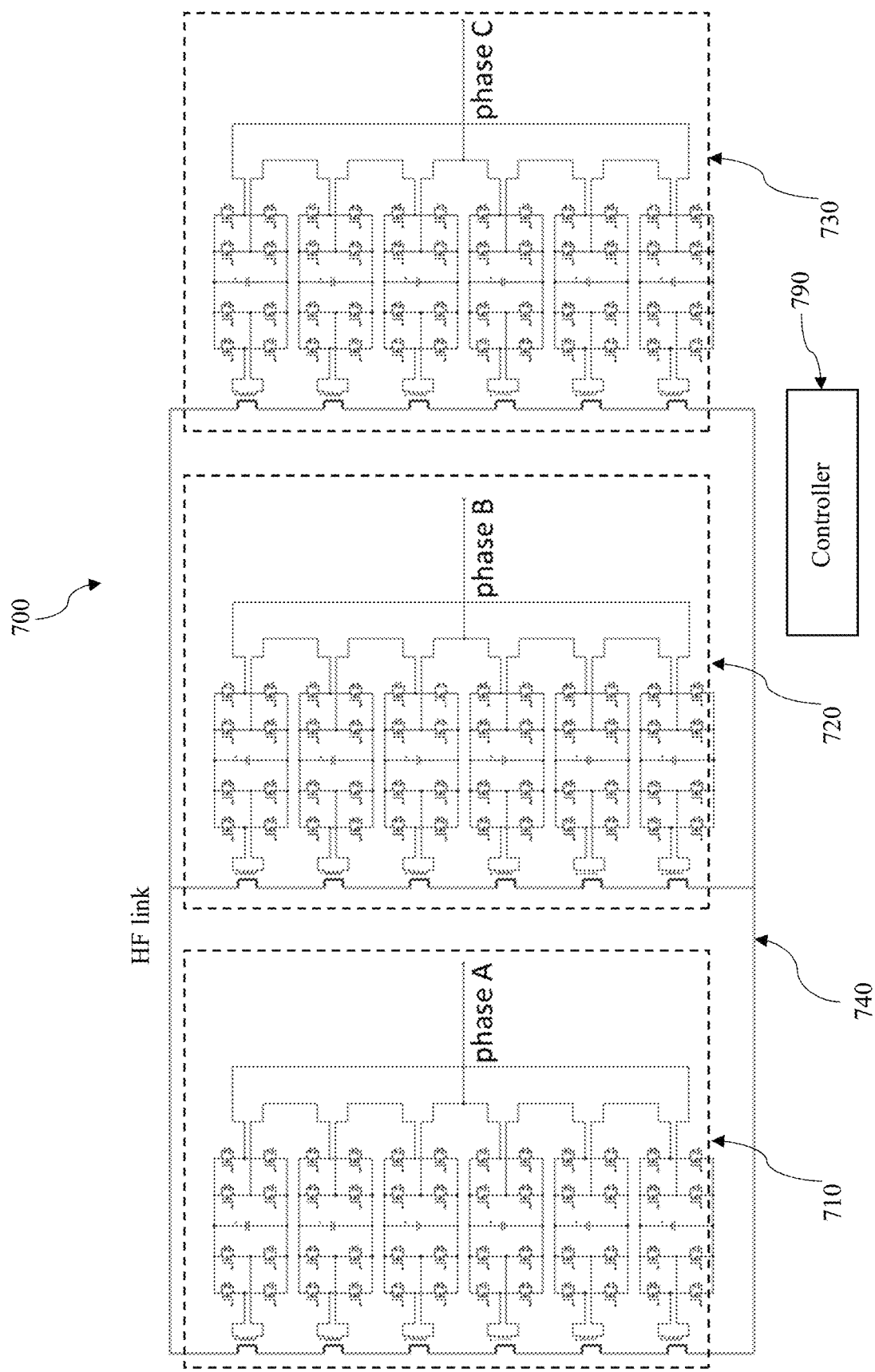
FIG. 7 shows an electrical schematic of the three-phase bridge illustrated in FIG. 5, according to one embodiment of the present invention.

FIG. 7 shows an electrical schematic of the three-phase bridge illustrated in FIG. 6 according to an embodiment of the present invention. The three-phase bridge 700 consists of three phase leg stacks 710, 720 and 730 wherein each of the phase legs comprises multiple building blocks using the modular transformer and power converter arrangement with improved insulation. The power converters within each module use switching bridges utilizing devices such as transistors. The three phase legs share a common high frequency link 740 that transfers power between the phase legs and/or their constituent building blocks. A controller 690 that may be centrally-located or distributed within the building blocks or phase legs may be used for communications, sensing quantities such as voltage or current, controlling the switching devices in the power converter modules, and activating appropriate bypass switches in case one or more building blocks need to be functionally isolated from the rest of the system. Although a three-phase embodiment is illustrated in FIG. 7, it should be noted that the invention is not limited to a three-phase system, but can incorporate other arrangements such as single-phase AC, DC or mixed AC and DC inputs/outputs using the modular transformer and power converter arrangement with improved insulation.

Figure 8:
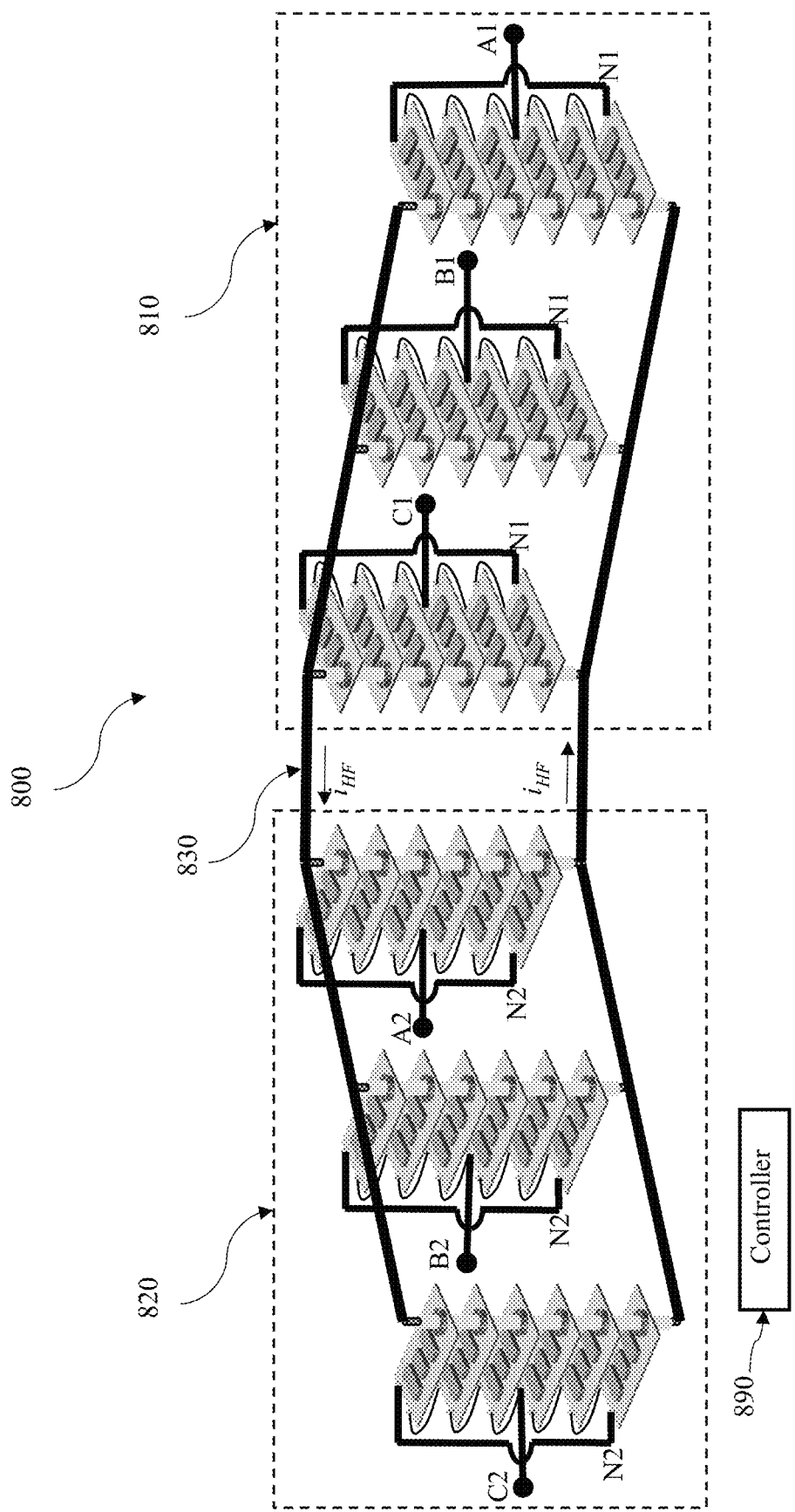
FIG. 8 illustrates two back-to-back modular three-phase bridges with two sets of three-phase AC terminals and a high frequency link that is coupled to the two sets of three-phase bridges and is galvanically isolated from the three-phase AC terminals, according to one embodiment of the present invention.

FIG. 8 illustrates a back-to-back combination 800 of two three-phase bridges, 810 and 820; wherein each of the phase legs comprises multiple building blocks using the modular transformer and power converter arrangement with improved insulation according to an embodiment of the present invention. The two three-phase bridges share a common high frequency link 830 that transfers power between the two three-phase bridges and within the bridges. A controller 890 that may be centrally-located or distributed within the building blocks, phase legs or three-phase bridges may be used for communications, sensing quantities such as voltage or current, controlling the switching devices in the power converter modules, and activating appropriate bypass switches in case one or more building blocks need to be functionally isolated from the rest of the system. The three-phase back-to-back system can be used in applications such as motor drives with an AC grid input at one set of three-phase terminals and variable voltage, variable frequency output to a motor at the other set of three-phase terminals. Although a three-phase AC back-to-back embodiment is illustrated in FIG. 8, it should be apparent that the invention is not limited to such a system, but can incorporate other layouts such as a three-phase bridge on one side and a DC bridge on another side for a battery energy storage or photovoltaic generation system or a multi-port system with mixed AC and DC inputs/outputs.

Figure 9:
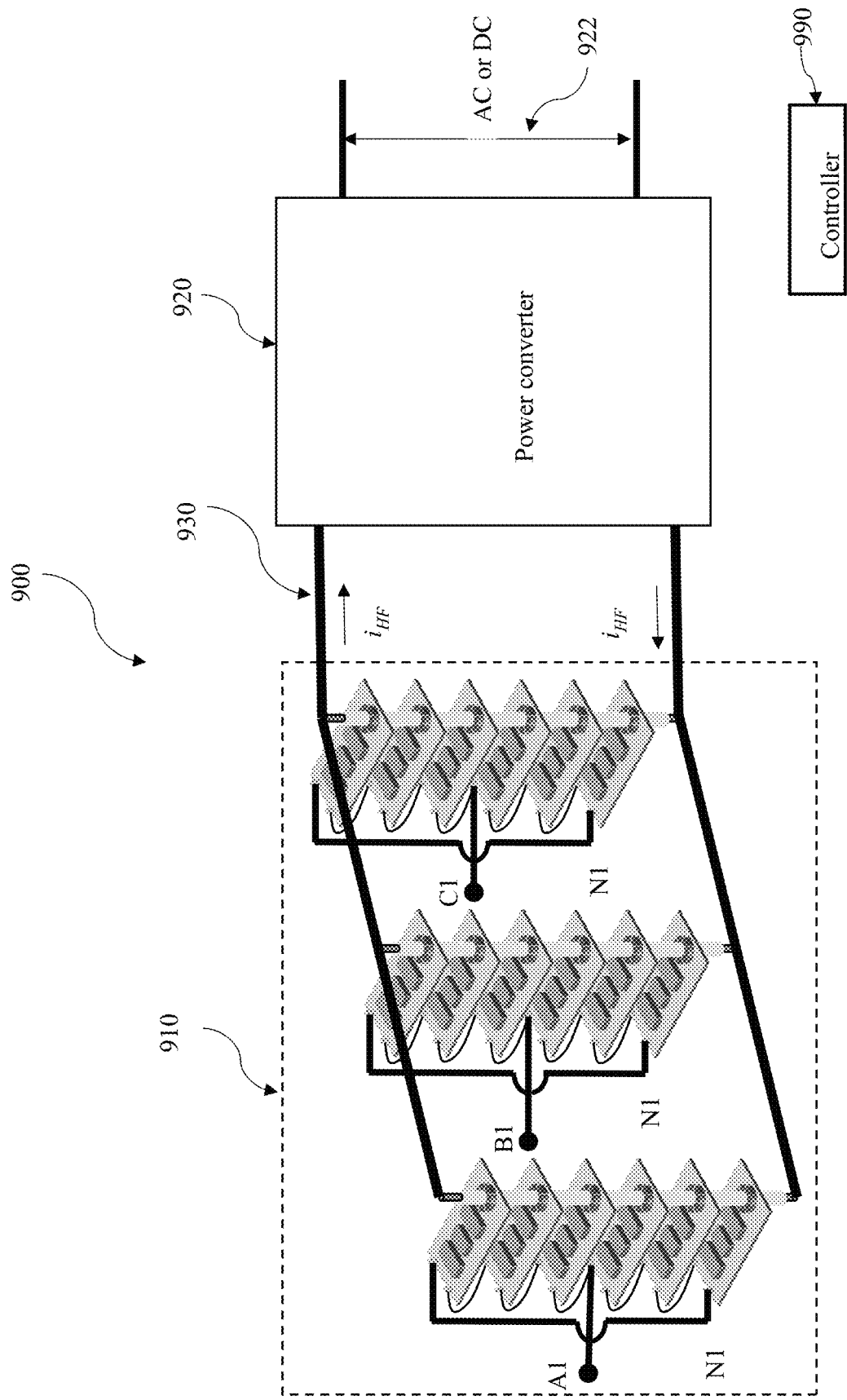
FIG. 9 illustrates a back-to-back configuration of two power conversion sections that provide AC or DC interfaces and are coupled with a high frequency link. One of the power conversion sections has a modular three-phase bridge with building blocks that are galvanically isolated through the high frequency link according to an embodiment of the present invention. The second power conversion section is coupled to the high frequency link with or without galvanic isolation.

FIG. 9 illustrates a back-to-back combination 900 of two power conversion sections, 910 and 920 according to another embodiment of the present invention. Section 910 is a three-phase bridge with the phase legs comprising multiple building blocks using the modular transformer and power converter arrangement with improved insulation according to an embodiment of the present invention. Section 920 is a power converter with an AC or DC port 922 and a high frequency port 930. High frequency port 930 is linked to the phase legs in section 910 to transfer power between sections 910 and 920. Section 920 can include galvanic isolation between ports 922 and 930 or can be a non-isolated converter. Section 920 is shown to have a single phase AC or DC port 922, but can incorporate other variations such as three phase AC or mixed AC and DC ports. A controller 990 that may be centrally-located or distributed within the building blocks, phase legs or power conversion sections may be used for communications, sensing quantities such as voltage or current, controlling the switching devices in the power converter modules, and activating appropriate bypass switches in case one or more building blocks need to be functionally isolated from the rest of the system.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. A power conversion system comprising a high frequency AC link and modular building blocks, wherein the high frequency AC link couples the modular building blocks and provides galvanic isolation and power transfer for the building blocks, and wherein the building blocks are comprised of transformers and power converter modules, and wherein the high frequency AC link comprises a conductor enclosed in an electrically insulating tube, and wherein the insulating tube comprises a conductive or semiconductive layer on at least one portion of its outer or inner surfaces.

2. The power conversion system of claim 1,
wherein at least one portion of an inner surface of the insulating tube has a conductive or semiconductive layer that is electrically connected or electrically referenced to the high frequency AC link conductor, such that their electric potentials are substantially equal, thereby reducing the electric field in the region between the high frequency AC link conductor and the at least one portion of the inner surface of the insulating tube.

3. The power conversion system of claim 1, wherein a portion of an outer surface of the insulating tube has a conductive or semiconductive layer that is electrically connected or electrically referenced to a winding of a transformer in one of the building blocks that is adjacent to the portion of the outer surface of the insulating tube, such that their electric potentials are substantially equal, thereby reducing the electric field in the region between the winding and the portion of the outer surface of the insulating tube.

4. The power conversion system of claim 1, wherein multiple portions of an outer surface of the insulating tube each have a conductive or semiconductive layer that is electrically connected or electrically referenced to a winding of a transformer in a building block that is adjacent to the respective portion of the outer surface of the insulating tube, such that their electric potentials are substantially equal, thereby reducing the electric field in the region between the winding and the portion of the outer surface of the insulating tube.

5. The power conversion system of claim 1, wherein the electrically insulating tube comprises an inorganic material of high dielectric strength.

6. The power conversion system of claim 5, wherein the inorganic material of high dielectric strength comprises mica.

7. The power conversion system of claim 1, wherein the electrically insulating tube comprises an organic material of high dielectric strength.

8. The power conversion system of claim 1, wherein the modular building blocks have multiple transformers or multiple transformer core windows, and wherein the high frequency AC link is arranged through the multiple transformers or the multiple transformer core windows for reduced electromagnetic noise.

9. The power conversion system of claim 1 with bypass switches for the individual modular building blocks, wherein one or more of the individual blocks can be bypassed while allowing the remaining building blocks to continue functioning.

10. The power conversion system of claim 1, wherein the high frequency AC link is connected to a power converter with an AC or DC port.

11. A power conversion system comprising a high frequency AC link and modular building blocks, wherein the high frequency AC link couples the modular building blocks and provides galvanic isolation and power transfer for the building blocks, and wherein the building blocks are comprised of transformers and power converter modules, and wherein the building blocks have AC or DC ports, and wherein at least one phase leg or set of the building blocks is formed by stacking the building blocks through a series connection of the AC or DC ports of the building blocks, and wherein the series connection has two terminals at its extremities and at least one terminal in between the extremities, and wherein some of the building blocks in the phase leg or set produce a voltage in opposition to the remaining building blocks in the phase leg or set such that the two terminals at the extremities of the series connection have a substantially equal voltage which is lower in magnitude than the voltage at the at least one terminal in between the extremities.

12. The power conversion system of claim 11, wherein the magnitude of the voltage along the series connection of the building blocks increases from the two extremities of the series connection to substantially the middle of the series connection.

13. The power conversion system of claim 11, wherein the two terminals at the extremities of the series connection are connected together to serve as a neutral or low voltage terminal for the phase leg or set of the building blocks.

14. The power conversion system of claim 11, wherein the at least one terminal in between the extremities of the series connection is used as at least one high voltage terminal for the phase leg or set of the building blocks.

15. The power conversion system of claim 11, wherein the modular building blocks are arranged in multiple phase legs or sets to provide DC or single-phase AC or poly-phase AC connections with the high frequency AC link transferring power between the phase legs or sets while providing galvanic isolation between them.

16. The power conversion system of claim 11, wherein the modular building blocks have multiple transformers or multiple transformer core windows and wherein the high frequency AC link is arranged through the multiple transformers or the multiple transformer core windows for reduced electromagnetic noise.

17. The power conversion system of claim 11 with bypass switches for the individual modular building blocks, wherein one or more of the individual blocks can be bypassed while allowing the remaining building blocks to continue functioning.

18. The power conversion system of claim 11, wherein the high frequency AC link is connected to a power converter with an AC or DC port.

19. A power conversion system comprising modular building blocks, wherein the building blocks are comprised of power converter modules, and wherein the building blocks have AC or DC ports, and wherein at least one phase leg or set of the building blocks is formed by stacking the building blocks through a series connection of the AC or DC ports of the building blocks, and wherein the series connection has two terminals at its extremities and at least one terminal in between the extremities, and wherein some of the building blocks in the phase leg or set produce a voltage in opposition to the remaining building blocks in the phase leg or set such that the two terminals at the extremities of the series connection have a substantially equal voltage which is lower in magnitude than the voltage at the at least one terminal in between the extremities.

20. The power conversion system of claim 19, wherein the two terminals at the extremities of the series connection are connected together to serve as a neutral or low voltage terminal for the phase leg or set of the building blocks, and wherein the at least one terminal in between the extremities of the series connection is used as at least one high voltage terminal for the phase leg or set of the building blocks.

* * * * *